United States Patent
Chang et al.

(10) Patent No.: US 8,036,239 B2
(45) Date of Patent: *Oct. 11, 2011

(54) METHOD AND SYSTEM FOR HSDPA BIT LEVEL PROCESSOR ENGINE

(76) Inventors: Li Fung Chang, Holmdel, NJ (US); Mark Hahm, Hartland, WI (US); Simon Baker, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,871

(22) Filed: Feb. 22, 2010

(65) Prior Publication Data

US 2010/0150165 A1 Jun. 17, 2010

Related U.S. Application Data

(63) Continuation of application No. 11/353,886, filed on Feb. 14, 2006, now Pat. No. 7,668,188.

(51) Int. Cl.
*H04L 12/28* (2006.01)
*H04L 12/56* (2006.01)

(52) U.S. Cl. ........................................ 370/415

(58) Field of Classification Search .................. 370/216, 370/232, 329, 415; 455/552, 452; 375/261; 712/238, 240; 714/795
See application file for complete search history.

(56) References Cited

U.S. PATENT DOCUMENTS

| | | | |
|---|---|---|---|
| 6,700,867 B2 * | 3/2004 | Classon et al. ............... | 370/216 |
| 7,328,332 B2 * | 2/2008 | Tran .............................. | 712/238 |
| 7,571,297 B2 * | 8/2009 | Gould et al. .................. | 711/167 |
| 7,603,613 B2 * | 10/2009 | Pisek et al. .................... | 714/795 |
| 7,668,188 B2 * | 2/2010 | Chang et al. .................. | 370/415 |
| 2005/0020299 A1 * | 1/2005 | Malone et al. ............. | 455/552.1 |
| 2005/0053168 A1 * | 3/2005 | Song et al. .................... | 375/261 |
| 2005/0201283 A1 * | 9/2005 | Yoon et al. ................... | 370/232 |
| 2005/0233754 A1 * | 10/2005 | Beale ......................... | 455/452.2 |
| 2006/0084469 A1 * | 4/2006 | Malone et al. ............. | 455/552.1 |
| 2006/0095745 A1 * | 5/2006 | Tran ............................. | 712/238 |
| 2006/0095750 A1 * | 5/2006 | Nye et al. ..................... | 712/240 |
| 2006/0195773 A1 * | 8/2006 | Pisek et al. .................... | 714/795 |
| 2006/0268777 A1 * | 11/2006 | Schmidt ....................... | 370/329 |
| 2007/0156991 A1 * | 7/2007 | Gould et al. .................. | 711/167 |
| 2007/0294496 A1 * | 12/2007 | Goss et al. .................... | 711/163 |
| 2009/0019262 A1 * | 1/2009 | Tashiro et al. ............... | 712/208 |
| 2009/0131101 A1 * | 5/2009 | Van Rooyen ............. | 455/552.1 |

* cited by examiner

*Primary Examiner* — Hassan Phillips
*Assistant Examiner* — Prenell Jones
(74) *Attorney, Agent, or Firm* — McAndrews, Held & Malloy, Ltd.

(57) ABSTRACT

A method for processing signals in a communication system is disclosed and may include pipelining processing of a received HSDPA bitstream within a single chip. The pipelining may include calculating a memory address for a current portion of a plurality of information bits in the received HSDPA bitstream, while storing on-chip, a portion of the plurality of information bits in the received HSDPA bitstream that is subsequent to the current portion. A portion of the plurality of information bits in the received HSDPA bitstream that is previous to the current portion may be decoded during the calculating and storing. The calculation of the memory address for the current portion of the plurality of information bits may be achieved without the use of a buffer. Processing of the plurality of information bits in the received HSDPA bitstream may be partitioned into a functional data processing path and functional address processing path.

50 Claims, 13 Drawing Sheets

METHOD AND SYSTEM FOR HSDPA BIT LEVEL PROCESSOR ENGINE

CROSS-REFERENCE TO RELATED APPLICATIONS/INCORPORATION BY REFERENCE

The present application claims the benefit of priority of U.S. patent application having Ser. No. 11/353,886, filed on Feb. 14, 2006. Additionally, this application makes reference to:

U.S. application Ser. No. 11/353,722 filed on Feb. 14, 2006;
U.S. application Ser. No. 11/354,704 filed on Feb. 14, 2006;
U.S. application Ser. No. 11/353,818 filed on Feb. 14, 2006;
U.S. application Ser. No. 11/141,478, filed on May 31, 2005;
U.S. application Ser. No. 11/140,805, filed on May 31, 2005, now issued as U.S Pat. No. 7,515,601, dated Apr. 7, 2009; and
U.S. application Ser. No. 11/142,213, filed on Jun. 1, 2005, now issued as U.S. Pat. No. 7,532,638, dated May. 12, 2009.

Each of the above stated applications is hereby incorporated herein by reference in its entirety.

FIELD OF THE INVENTION

Certain embodiments of the invention relate to wireless communication. More specifically, certain embodiments of the invention relate to a method and system for an HSDPA bit level processor engine.

BACKGROUND OF THE INVENTION

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

The General Packet Radio Service (GPRS) and Enhanced Data rates for GSM (EDGE) technologies may be utilized for enhancing the data throughput of present second generation (2G) systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology utilizes variable coding rates and supports 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbits/s to 1.8 Mbit/s with QPSK modulation and 3.6 Mbit/s and up with 16-QAM modulation. The highest capability class supports the maximum theoretical bit rate of 14.4 Mbit/s.

Implementing advanced wireless technologies, such as WCDMA and/or HSDPA, may still require overcoming some architectural hurdles because of the very high speed, and wide bandwidth data transfers that may be supported by such wireless technologies. For example, an HSDPA Category 8 supports 7.2 Mbit/s of peak data throughput rate. Furthermore, various antenna architectures, such as multiple-input multiple-output (MIMO) antenna architectures, as well as multipath processing receiver circuitry may be implemented within a handheld device to process the high speed HSDPA bitstream. However, the implementation of HSDPA-enabled devices that provide higher data rates and lower latency to users may result in increased power consumption, implementation complexity, mobile processor real estate, and ultimately, increased handheld device size.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for an HSDPA bit level processor engine, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for processing signals in a communication system. In one embodiment of the invention, the method may comprise pipelining processing of a received HSDPA bitstream within a single chip. The pipelining may comprise calculating a memory address for a current portion of a plurality of information bits in the received HSDPA bitstream, while simultaneously storing on-chip, a portion of the plurality of information bits in the received HSDPA bitstream that is subsequent to the current portion. A portion of the plurality of information bits in the received HSDPA bitstream that is previous to the current portion may be decoded during the calculating and the storing. The calculation of the memory address for the current portion of the plurality of information bits may be achieved without the use of a buffer. Processing of the plurality of information bits in the received HSDPA bitstream may be partitioned into a functional data processing path and a functional address processing path. A decoding signal that initiates the decoding may be generated subsequent to the calculation of the memory address for the current portion of the plurality of information bits.

An interrupt may be communicated to a host processor subsequent to the calculation of the memory address for the current portion of the plurality of information bits. Upon receipt of the interrupt, the host processor may generate a decoding signal that initiates the decoding. At least a portion of the plurality of information bits in the received HSDPA bitstream may be sliced and/or quantized to calculate the memory address. The calculation of the memory address for the current portion of the plurality of information bits may comprise constellation re-arrangement, second level de-interleaving, symbol sequence concatenation, symbol sequence splitting, and/or de-rate-matching.

Figure 1A:
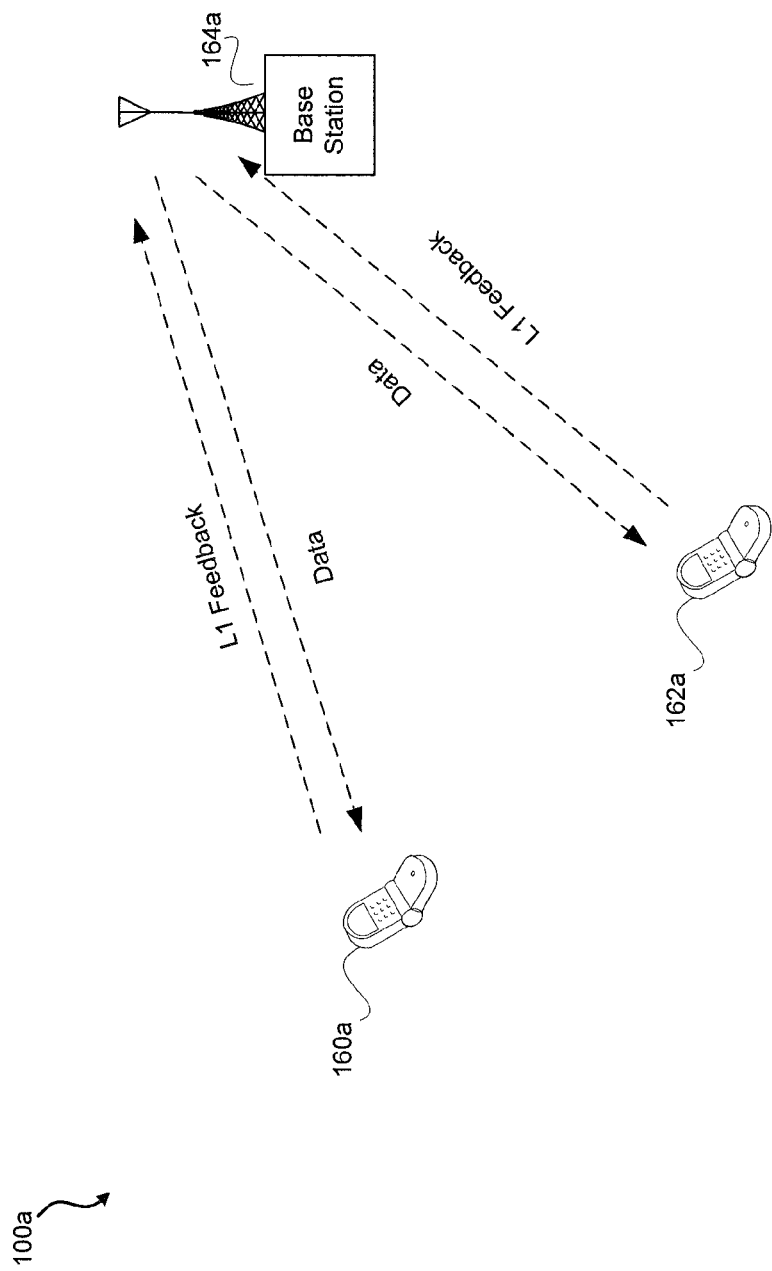
FIG. 1A illustrates an exemplary HSDPA distributed architecture that may be utilized in connection with an embodiment of the invention.

FIG. 1A illustrates an exemplary HSDPA distributed architecture that may be utilized in connection with an embodiment of the invention. Referring to FIG. 1A, there is shown terminals 160a and 162a and a base station (BS) 164a.

HSDPA is built on a distributed architecture that achieves low delay link adaptation by placing key processing at the BS 164a and thus closer to the air interface as illustrated. Accordingly, the MAC layer at the BS 164a is moved from Layer 2 to Layer 1, which implies that the systems may respond in a much faster manner with data access. Fast link adaptation methods, which are generally well established within existing GSM/EDGE standards, include fast physical layer (L1) retransmission combining and link adaptation techniques. These techniques may deliver significantly improved packet data throughput performance between the mobile terminals 160a and 162a and the BS 164a.

The HSDPA technology employs several important new technological advances. Some of these may comprise scheduling for the downlink packet data operation at the BS 164a, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. U.S. application Ser. No. 11/353,818 filed on even date herewith discloses a detailed description of a method and system for buffer-less HARQ for supporting HSDPA and is hereby incorporated by reference in its entirety. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1B:
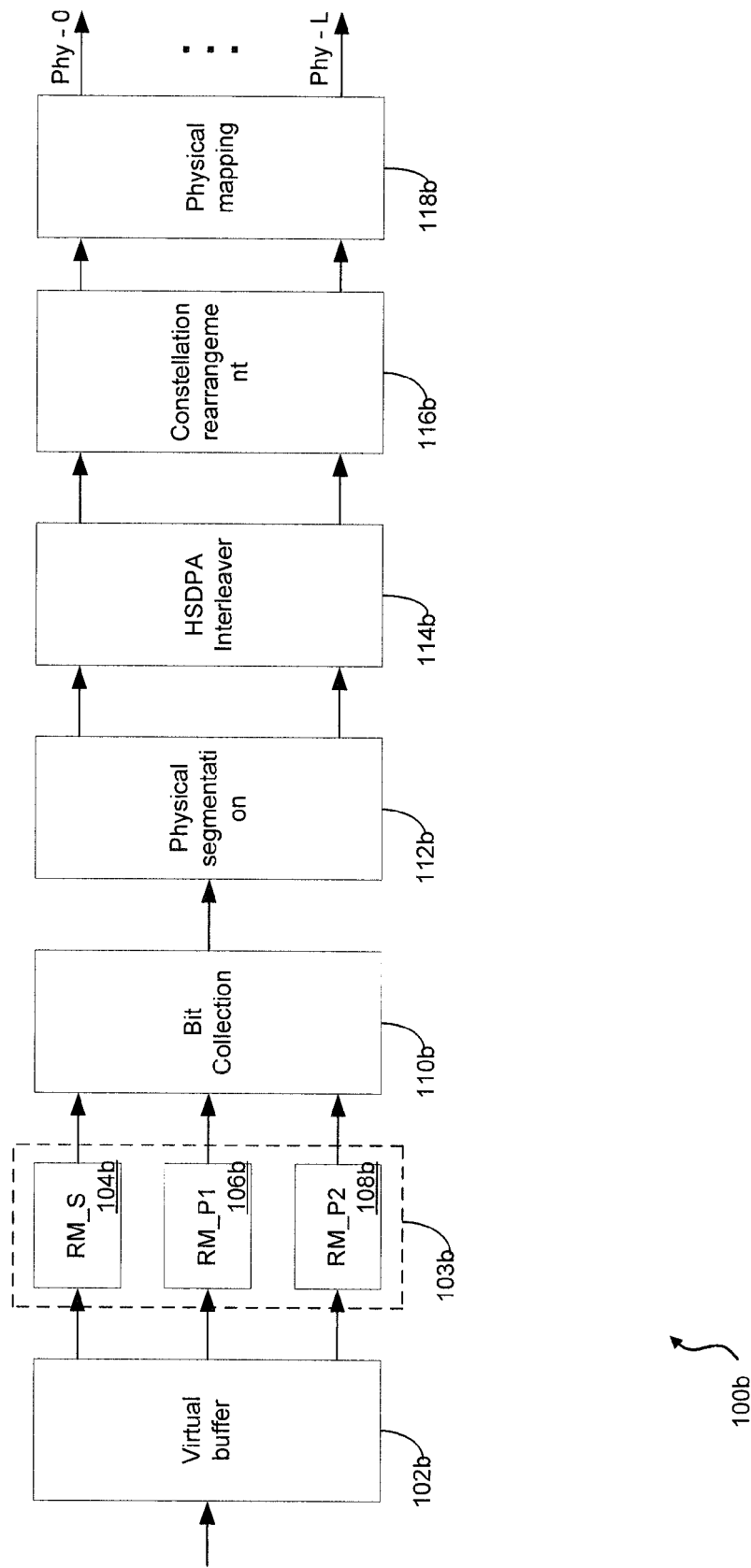
FIG. 1B is a block diagram that illustrates functional partitioning of the transmit side of HSDPA bit processing, which may be utilized in connection with an embodiment of the invention.

FIG. 1B is a block diagram that illustrates functional partitioning of the transmit side of HSDPA bit processing, which may be utilized in connection with an embodiment of the invention. Referring to FIG. 1B, there is shown a virtual buffer block 102b, a second rate matching block 103b, a bit collection block 110b, a physical segmentation block 112b, a HSDPA interleaver block 114b, a constellation rearrangement block 116b, and a physical mapping block 118b. The second rate matching block 103b may comprise a plurality of rate matching blocks, for example, a systematic rate matching stream (RM_S) block 104b, a parity-1 rate matching stream block 106b, and a parity-2 rate matching stream block 108b.

FIG. 1B illustrates the partitioning of the received bitstreams on the transmit side into cascaded address mapping functions. The virtual buffer 102b may comprise suitable logic, circuitry and/or code that may be enabled to receive a bitstream $N_{TTI}$, and generate a plurality of bitstreams, a systematic bitstream Nsys, a parity-1 bitstream Np1 and a parity-2 bitstream Np2. The Nsys bitstream may be passed through a systematic rate matching (RM_S) block 104b to generate a bitstream Nt,sys. The Np1 bitstream may be passed through a parity-1 rate matching (RM_P1) block 106b to generate a bitstream Nt,p1. The Np2 bitstream may be passed through a parity-1 rate matching (RM_P2) block 108b to generate a bitstream Nt,p2. This process maps the three stream addresses' range to a range dictated by the hardware (HW) symbol rate. The second rate matching block 103b may enable bit puncturing by omitting bits by predefined schemes, for example, a systematic rate matching stream, a parity-1 rate matching stream, and a parity-2 rate matching stream. The second rate matching block 103b may be enabled to match the required fixed rate dictated by the hardware. The three rate matching processes may be parameterized by enabling the UE to re-map the received stream of bits to their original location.

The bit collection block 110b may comprise suitable logic, circuitry and/or code that may enable writing of the three bitstreams column wise into a square array with 3 predefined domains for the three bit types, for example, systematic, parity-1 and parity-2. The bitstreams may be read full column-wise, for example, 2 rows in the case of QPSK and 4-rows in the case of QAM16. Each column may represent a symbol pair or four bits, for example. The physical segmentation block 112b may enable partitioning of the single symbol stream into L streams, where L=1 . . . 15. The first 480 symbols may be associated with physical channel (Phy-Ch) 1, for example, the second 480 symbols may be associated with Phy-Ch 2, for example, and so on. Each of the 480 symbols may be passed through the HSDPA interleaver block 114b. In the case of QAM modulation, each of the 4 bits may be passed through the constellation rearrangement block 116b for further mapping. The physical mapping block 118b may be enabled to assign each Phy-Ch to the 15 OVSF codes, for example, and 2 or 4 bits may be assigned to the I and Q values.

Figure 1C:
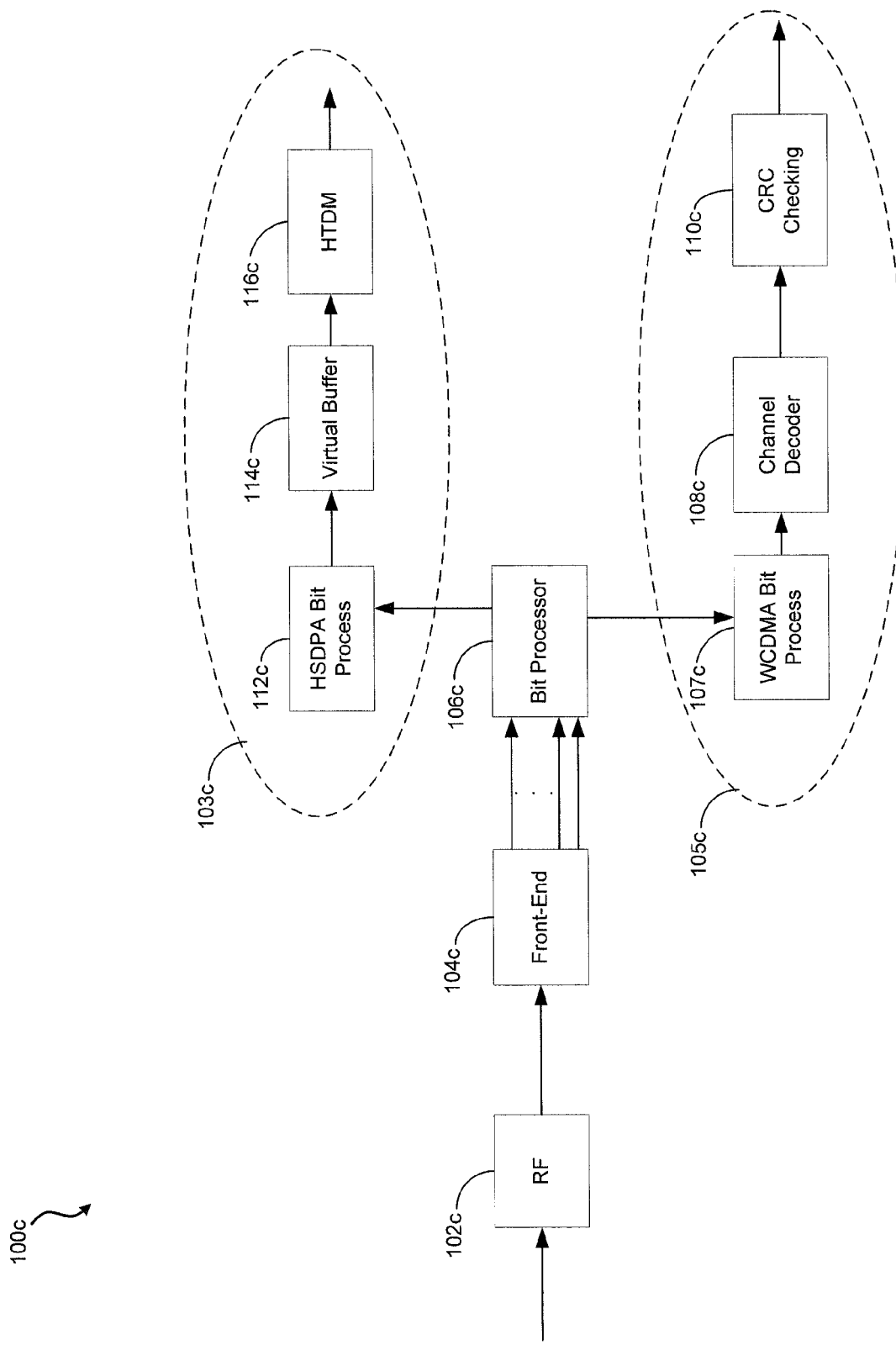
FIG. 1C is a block diagram that illustrates exemplary partitioning of the physical layer of a HSDPA receiver into a plurality of functional blocks, which may be utilized in connection with an embodiment of the invention.

FIG. 1C is a block diagram that illustrates exemplary partitioning of the physical layer of a HSDPA receiver into a plurality of functional blocks, which may be utilized in connection with an embodiment of the invention. Referring to FIG. 1C, a physical layer of a WCDMA based mobile technology, also known as user equipment (UE) 100c may comprise a RF block 102c, a front-end block 104c, and a bit-processor 106c. The user equipment 100c may further comprise an HSDPA processing block 103c and a WCDMA processing block 105c. The HSDPA processing block 103c may comprise an HSDPA bit process block 112c, a virtual buffer 114c, and an HSDPA turbo decoding module (HTDM) 116c. The WCDMA processing block 105c may comprise a WCDMA bit process block 107c, a channel decoder 108c, and a cyclic redundancy check (CRC) checking block 110c.

The RF block 102c may comprise suitable logic, circuitry and/or code that may enable conversion of the electromagnetic wave transmitted by the network transmitter or base-station into an electric signal which is filtered and amplified through its receiver antenna and the frequency may be shifted to baseband. The signal may be sampled, converted to a numeric representation and output to the front-end block 104c. The front-end block 104c may comprise suitable logic, circuitry and/or code that may enable performance of numerous operations whereby the in-phase (I) and the quadrature (Q) chip values may be combined, where the chip frequency is 3.84 MHz, for example. Each of the 16 sequential values of I and Q may be projected on a set of orthogonal sequences, orthogonal variable spreading factor (OVSF) vectors, codes or functions and combined into a set of symbols, where a symbol may be represented by two numeric values, the in-phase component (I) and the quadrature component (Q).

The UE 100c may be allocated by the network k with k=1 . . . 15 OVSF functions. Due to the projection operation, at each chip-time, k symbols may be created. The rate of generating symbols may be chip-rate/16=3.84 MHz/16=240 kHz, for example. In HSDPA, the duration of receiving data may be partitioned into a transmission time interval (TTI) of 2 milliseconds, for example. The number of symbols per TTI may be k×960 symbols. The number k of OVSF functions allocated to the UE 100c may indicate that a network may be employed to control the rate of receiving data by the UE 100c. The number of OVSF functions represents a physical constraint of transmitting/receiving rate and may be referred to as a physical channel (Phy-Ch). For example, a mobile with k=1 indicates that one OVSF function or one Phy-Ch is being allocated to the UE 100c. The mobile may receive 1920 symbols per TTI, for example, and this rate may be doubled by setting k=2, for example. In this case, the mobile simultaneously receives two streams of 480 symbols each, for example. The total symbol rate may directly indicate the data rate the UE 100c receives.

Each pair I,Q of a symbol may represent a pair of soft bits when QPSK modulation is used. Alternatively, the I,Q pair may pass through a slicing process whereby the two soft bits may be partitioned into 4 soft bits when QAM16 modulation is utilized. The numeric value or amplitude of a soft bit represents the certainty or probability that the bit is either one or zero. The multiple streams of soft bits may be input to the bit-processor block 106c.

The bit-processor block 106c may comprise suitable logic, circuitry and/or code that may be enabled to partition the received multiple streams of soft bits into two processes, the WCDMA bit process and the HSDPA bit process. The WCDMA processing may be performed by the WCDMA processing block 105c, and HSDPA processing may be performed by the HSDPA processing block 103c. One or more of the blocks within the WCDMA processing block 105c and the HSDPA processing block 103c may be implemented within the bit processor 106c.

The WCDMA bit process block 107c may process a portion of the multiple streams of received soft bits based on the WCDMA standard, and includes a de-rate matching process that may be applied to the parity-1 bits and to parity-2 bits. The de-rate matching process may include reversing the rate matching process and mapping the received bits into their original addresses. It facilitates reading the bits from the virtual buffer block 114c and writing the bits in the appropriate encoder buffer addresses enabling the channel decoding carried out in the channel decoder block 108c. The bitstream portion processed by the WCDMA bit process block 107c may be further processed by the channel decoder block 108c and the CRC checking block 110c.

The HSDPA process block 112c may process a portion of the multiple streams of received soft bits based on the HSDPA standard and may enable retransmission of an encoded block associated with a given TTI that failed to be decoded. The decoding of a data block may be carried out over several TTI's and the blocks of several processes may be stored in the virtual buffer 114c. An uplink to the base station may report the success by an acknowledgement (ACK) packet or the failure by a no acknowledgement (NACK) packet. The HSDPA process block 112c may be enabled to decode a block by facilitating the retransmit, or alternatively, initiating the transmit of a new block of data. A downlink channel known as HSDPA shared control channel (HSCCH), which is shared by all HSDPA users, may be received at each TTI. Its content identifies the UE 100c and it includes the necessary parameters that facilitate the decoding of the current data content of the current TTI. Data stored in the virtual buffer 114c may be decoded by the HTDM 116c.

Figure 2A:
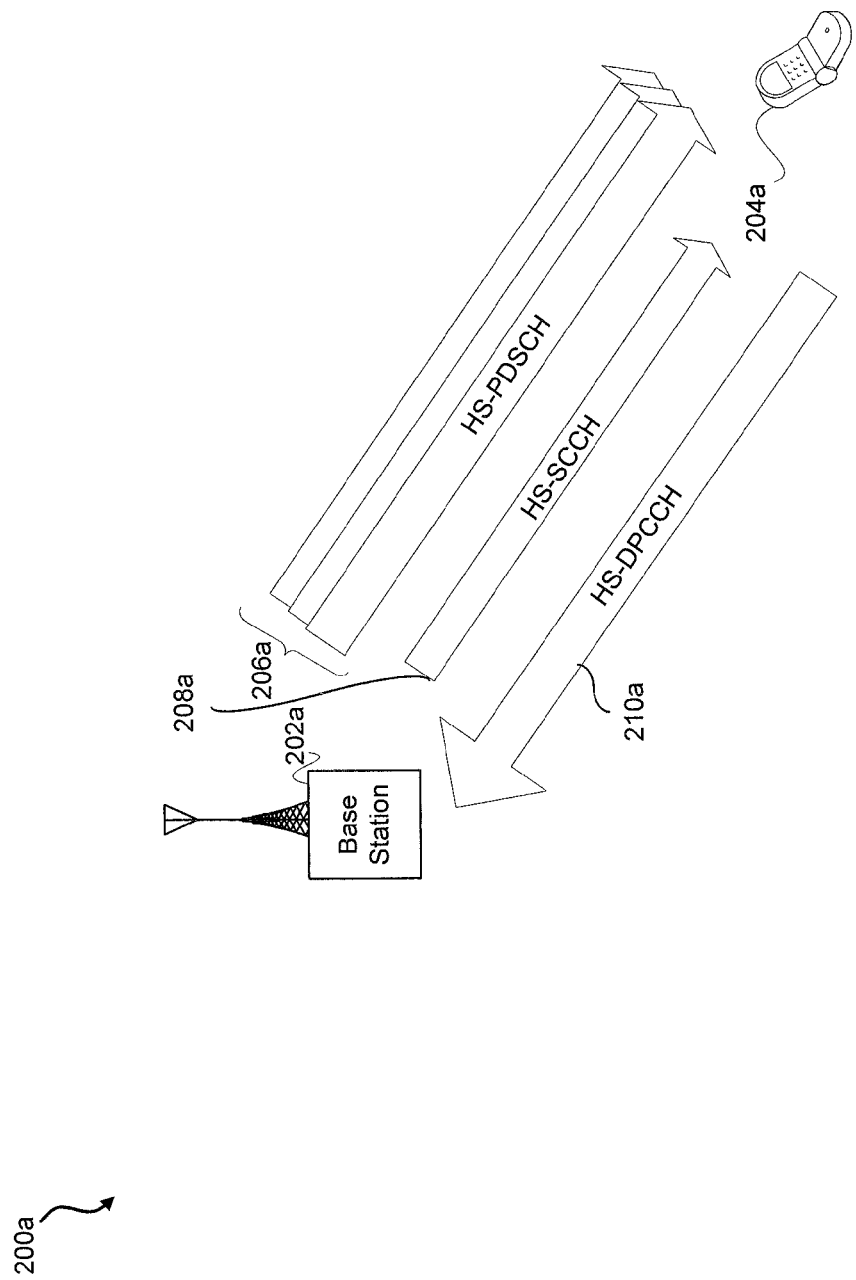
FIG. 2A is a diagram illustrating an exemplary HSDPA channel structure, which may be utilized in connection with an embodiment of the invention.

FIG. 2A is a diagram illustrating exemplary HSDPA channel structure, which may be utilized in connection with an embodiment of the invention. Referring to FIG. 2A, three additional channels may be used to support HSDPA connection between the base station 202a and the UE 204a. A high-speed downlink shared channel (HS-DSCH) 206a and a high speed shared control channel (HS-SCCH) 208a may be used on the downlink between the base station 202a and the UE 204a. A high-speed dedicated physical control channel (HS-DPCCH) 210a may be used on the uplink between the UE 204a and the base station 202a.

The HS-DPCCH 210a may be used as a signaling channel that carries acknowledge (ACK) and non-acknowledge (NACK) signals and measurement reports. The HS-DSCH 206a may comprise a plurality of high-speed physical downlink shared channel (HS-PDSCH) and may be used to carry user data. The HS-SCCH 208a may be used to carry control information, such as modulation, HARQ redundancy/constellation version, HARQ processor ID, new data indication, index of the transport block size, and/or user equipment (UE) identity information corresponding to the data carried in the HS-DSCH channel 206a.

The UE 204a may use several physical channel-related parameters to indicate to the base station 202a its capability to support the HSDPA services. The base station 202a may then configure RB (Radio Bearers) based on the capabilities of the UE 204a. The UE 204a capability may be categorized by the following HSDPA parameters, listed below in Table 1.

TABLE 1

HS-DSCH Categories and HSDPA Parameters

| HS-DSCH category | Maximum number of HS-DSCH codes received | Minimum inter-TTI interval | Maximum number of bits of an HS-DSCH transport block received within an HS-DSCH TTI | Total number of soft channel bits |
|---|---|---|---|---|
| Category 1 | 5 | 3 | 7298 | 19200 |
| Category 2 | 5 | 3 | 7298 | 28800 |
| Category 3 | 5 | 2 | 7298 | 28800 |
| Category 4 | 5 | 2 | 7298 | 38400 |
| Category 5 | 5 | 1 | 7298 | 57600 |
| Category 6 | 5 | 1 | 7298 | 67200 |
| Category 7 | 10 | 1 | 14411 | 115200 |
| Category 8 | 10 | 1 | 14411 | 134400 |
| Category 11 | 5 | 2 | 3630 | 14400 |
| Category 12 | 5 | 1 | 3630 | 28800 |

The maximum number of HS-DSCH codes received parameter may define the maximum number of HS-DSCH codes that the UE 204a may be adapted to receive. The total number of soft channel bits in HS-DSCH parameter may define the maximum number of soft channel bits over all HARQ processes. In instances when explicit signaling is used, the base station 202a may configure processing memory size, such as an incremental redundancy (IR) memory, for each HARQ process so that the UE 204a with low number of soft information channel bits may be limited to support chase combining. High number of soft information channel bits may allow the UE 204a to perform either chase combing or incremental redundancy (IR). The minimum inter-TTI interval in HS-DSCH parameter may define the distance from the beginning of a TTI to the beginning of the next TTI that can be assigned to the UE 204a. The maximum number of bits of an HS-DSCH transport block received within an HS-DSCH TTI parameter may define the maximum number of bits in a transport block within a TTI.

In accordance with an embodiment of the invention, during an exemplary configuration of UE 204a, the UE 204a may inform the base station 202a that it supports HSDPA and the associated physical layer category, using a UE radio access capability element in the "RRC connection setup complete" message, for example. Once the category is selected by the UE 204a, the total HSDPA IR memory in the UE 204a may be fixed. The base station 202a may then configure the memory size for each HARQ via explicit signaling message containing HARQ parameters, for example. The HARQ parameters may be carried by an information element, such as HARQ_info element, in the transport channel configuration message communicated via HS-SCCH 208a. The HARQ_info element may include the number of HARQ processes, and at least 8 may be supported. The HARQ_info element may also include a HARQ memory partition mechanism. If the HARQ_info element is indicated as implicit, then the total soft bit memory may be divided equally among the number of HARQ process. If the HARQ_info element is indicated as explicit, then the memory may be partitioned based on the specified "process memory size" carried in this information element. The size of the memory may be referred to as size of the "virtual IR memory" and may be used in the HARQ process described herein.

Figure 2B:
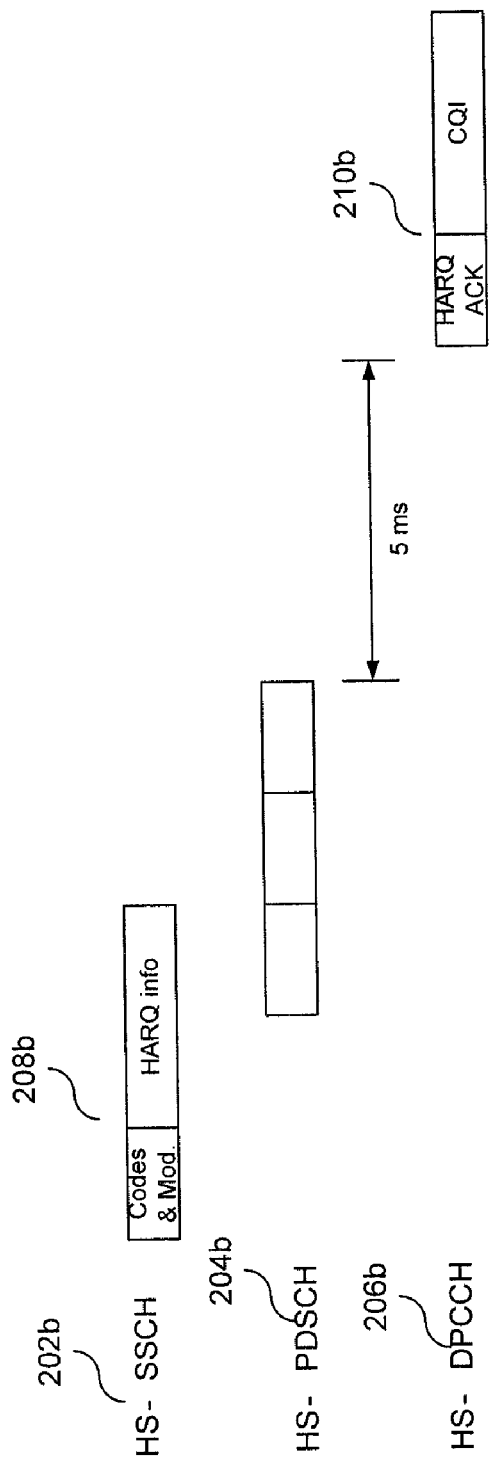
FIG. 2B is a diagram illustrating timing of exemplary HSDPA channels, which may be utilized in connection with an embodiment of the invention.

FIG. 2B is a diagram illustrating timing of exemplary HSDPA channels, which may be utilized in connection with an embodiment of the invention. Referring to FIG. 2B, the HS-SSCH 202b may transmit the control information 208b 2 slots prior to the HS-PDSCH 204b to allow enough time for decoding the control format of the HS-DSCH signals in the following TTI period. The delay in sending the ACK message 210b via the HS-DPCCH 206b may be 5 ms, for example. Therefore, the ACK delay plus processing delay of the ACK message at the base station 202a may exceed 8 ms. During this period, the base station 202a may send several HS-DSCH data packets via the HS-PDSCH 204b to maximize the throughput and resource utilization. If the data is send to the same user, then multiple HARQ processors may be used at the UE 204a, as described herein below. In addition, IR soft memory within the UE 204a may be partitioned among the active HARQ processors via explicit signaling from higher layer.

After the UE 204a receives HSDPA data from the base station 202a, the UE 204a may decode the data from the HS-SCCH channel 208a to obtain the channelization codes and modulation format. The UE 204a may then decode the HARQ portions of the HS-SCCH 208a to obtain HARQ processor ID, redundancy/constellation version, new data indication, index of the transport block size, and UE identity. If the UE identity matches identity information of UE 204a, then the decoding procedure may be initiated by a host processor through setting configuration registers. The host processor may then initiate decoding via a bit level processor, as described herein below.

Figure 3:
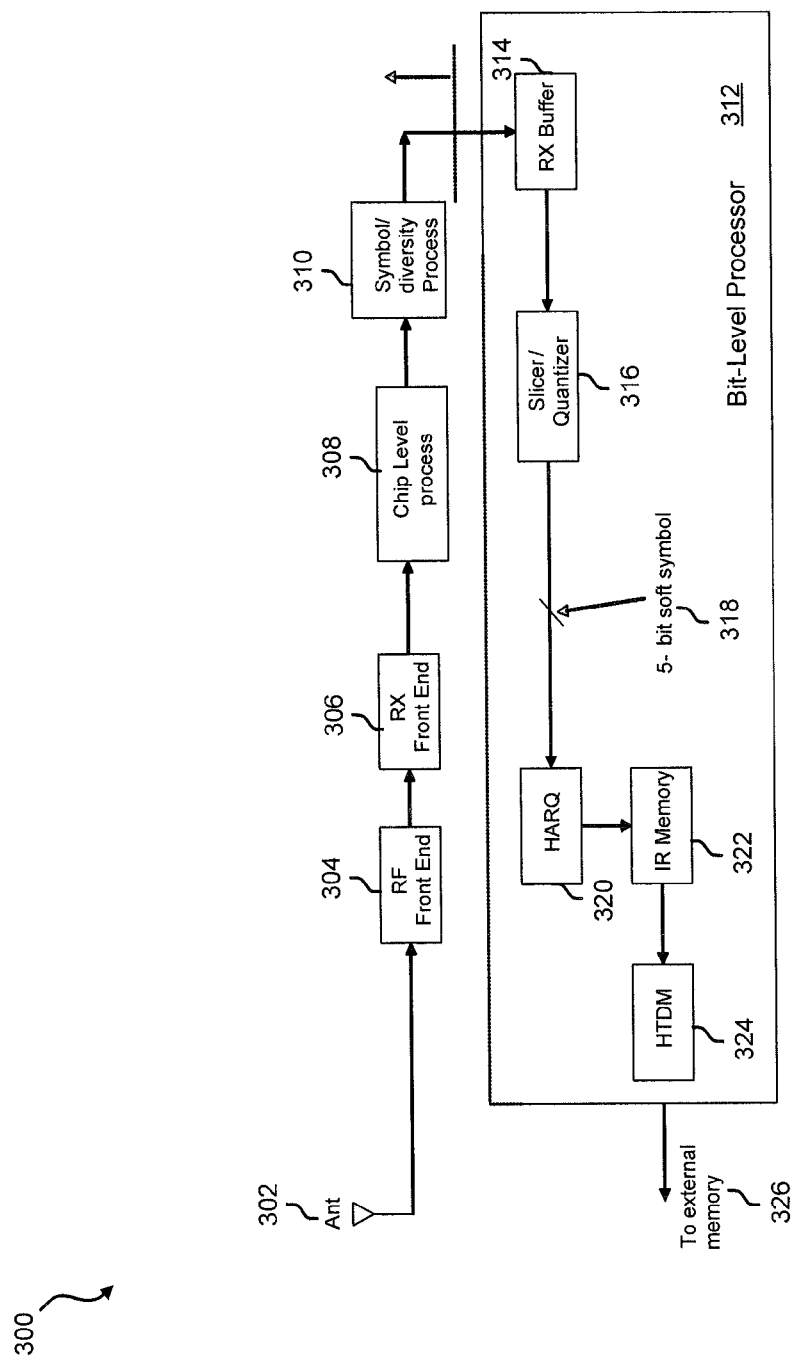
FIG. 3 is a high-level block diagram illustrating an exemplary data processing path for a received HSDPA signal, in accordance with an embodiment of the invention.

FIG. 3 is a high-level block diagram illustrating an exemplary data processing path for a received HSDPA signal, in accordance with an embodiment of the invention. Referring to FIG. 3, an HSDPA receiver circuit 300 may comprise an antenna 302, an RF front end block 304, a receiver (RX) front end block 306, a chip level processor 308, a symbol/diversity processor 310, and a bit level processor (BLP) 312. The BLP 312 may comprise a RX buffer 314, a slicer/quantizer block 316, a HARQ block 320, an IR memory 322, and an HSDPA turbo decoding module (HTDM) 324.

The RF front end block 304 may comprise suitable logic, circuitry and/or code that may enable conversion of the electromagnetic waves received via the antenna 302 from a network transmitter or a base-station into an electrical signal. The electrical signal may be further filtered and amplified and the frequency may be shifted to baseband. The signal may be sampled, converted to a numeric representation and output to the RX front end block 306. The RX front end block 306 may comprise suitable logic, circuitry, and/or code that may enable performance of numerous operations whereby the in-phase (I) and the quadrature (Q) chip values may be combined, where the chip frequency is 3.84 MHz, for example. Each of the 16 sequential values of I and Q may be projected on a set of orthogonal sequences, orthogonal variable spreading factor (OVSF) vectors, codes or functions and combined into a set of symbols. A symbol may be represented by two numeric values, the in-phase component (I) and the quadrature component (Q). Each I,Q pair of a symbol may represent a pair of soft bits when QPSK modulation is used. Alternatively, the I,Q pair may pass through a slicing process whereby the two soft bits may be partitioned into 4 soft bits when QAM16 modulation is utilized. The numeric value or amplitude of a soft bit represents the certainty or probability that the bit is either one or zero. The multiple streams of soft bits may be input to the chip level processor 308.

The chip level processor 308 may comprise suitable circuitry, logic, and/or code and may enable channel estimations of the actual time varying impulse response of the HSDPA channel per base station. Furthermore, the chip level processor 308 may be adapted to track in time and estimate a complex phase and/or amplitude values of the received signal. In this regard, channel estimates and timing information may be communicated to the symbol/diversity processing block 310. The symbol/diversity processing block 310 may comprise suitable logic, circuitry, and/or code that may be enabled to combine signals transmitted from multiple antennas in diversity modes, for example. The diversity modes may comprise open loop (OL), closed loop 1 (CL1), and closed loop 2 (CL2).

The BLP 312 may comprise suitable circuitry, logic, and/or code and may enable processing, such as decoding of received HSDPA bitstream based on the HSDPA standard and may enable retransmission of an encoded block associated with a given TTI that failed to be decoded. The decoding of an HSDPA data block may be carried out over several TTI's and the blocks of several processes may be stored in the virtual buffer, or IR memory 322. An uplink from the BLP 312 to a base station may report the success by an acknowledgement (ACK) packet or the failure by a no acknowledgement (NACK) packet.

The RX buffer 314 may comprise a circular buffer that may be enabled to store de-scrambled received data. The size of the RX buffer 314 may be larger than the maximum number of symbols per TTI period. For category 7 and 8, the maximum number of de-scrambled symbols per TTI may be 480*2 (I and Q)*10 (codes)*10 (bit-width for the de-scrambled symbols) which equals 96 kbits. The exact size of the RX buffer 314 may depend on how fast the HARQ module 320 processes a TTI-period of the data. The de-scrambled symbols received from the symbol/diversity processing block 310 may be stored in the RX buffer 314 in the order of the first I, Q symbols from channels 1-10 followed by the $2^{nd}$ I, Q symbols from channels 1-10, and so on. That is: $I_{1,1}, Q_{1,1}, I_{1,2}, Q_{1,2}, I_{1,3}, Q_{1,3}, \ldots I_{1,n}, Q_{1,n}, I_{2,1}, Q_{2,1}, I_{2,2}, Q_{2,2}, I_{2,3}, Q_{2,3}, \ldots, I_{480,n}, Q_{480,n}$, where "n" may be the index of the last physical channel. For 10 codes, n=10. Since the HARQ block 320 may function on a symbol-by-symbol basis, the size of the RX buffer 314 may be reduced to less than a TTI period, for example. The exact size of the RX buffer 314 may depend on the design of the HARQ block 320 and timing budget of the entire BLP 312. In one embodiment of the invention, the size of the RX buffer 314 may be 2 slots.

In operation, a signal from the symbol/diversity block 310 may trigger the RX buffer 314 to move data from internal memory of the symbol/diversity block 310 to the RX buffer 314. When data is moved from the symbol/diversity block 310 to the RX buffer 314, the signal energy over N symbols, for examples 64 symbols, for both I and Q may be calculated. This value may be used as the weight "g" in the slicer/quantizer 316 for the group of N received symbols, as described below with regard to FIG. 4. For each TTI, there may be seven groups of "64 symbols," for example. The "g" value may be updated 7 times per TTI, and the last 32 symbols (480−7*64) may reuse the $7^{th}$ weight as their weight in the slicer/quantizer operation within the BLP 312. While the RX buffer 314 is writing data from diversity block to its memory space, the HSDPA receiver block 300 may activate the BLP 312 upon completing decoding of the HS-PDSCH data. The BLP 312 may then initiate reading 10-bit I, Q symbols from the RX buffer 314 and may pass them to the slicer/quantizer block 316 for further processing.

The slicer/quantizer block 316 may comprise suitable circuitry, logic, and/or code and may enable performing of the demodulation function for the 16 QAM signals, and/or quantization of the received signals to 5-bit soft symbols. The output of the slicer/quantizer block 316 may comprise a 5-bit soft symbol 318 and may be communicated to the HARQ processor 320 for further processing.

The HARQ processor 320 may comprise suitable circuitry, logic, and/or code and may enable performing of a plurality of processing functions, such as constellation re-arrangement for 16QAM, $2^{nd}$ level de-interleaving on each physical channel, concatenation of the de-interleaved symbols from each physical channel, splitting the systematic, parity 1 and parity 2 symbol sequences, and/or de-rate-matching of the systematic, parity 1 and parity symbol sequences individually to de-match the symbols from their allocated physical channel capacity to the allocated IR memory capacity. In one embodiment of the invention, the BLP 312 may utilize a plurality of HARQ processors, each of which may be enabled to handle a particular portion of memory.

The IR memory 322 may comprise an on-chip memory. The size of the IR memory 322 may be 134400*5 (bit-width for the soft symbol)=672 kbits, for example. The IR memory 322 may be partitioned into a plurality of sectors, depending on the number of HARQ processors to be utilized within the BLP 312. In one exemplary embodiment of the invention, each HARQ processor may be allocated for one sector of IR memory by default. Furthermore, within each IR memory sector, the systematic symbols, parity 1 symbols and parity 2 symbols may be stored in three separate memory blocks.

The HSDPA turbo decoding module (HTDM) 324 may comprise suitable circuitry, logic, and/or code and may enable a plurality of processing function, such as $1^{st}$ rate de-matching, turbo decoding, de-scrambling, and/or cyclic redundancy check (CRC) checking. The HTDM 324 may receive data from the IR memory 322 and may perform rate matching 1 operations on the parity-1 and parity-2 bitstream. The resulting data may be decoded using turbo decoding with early termination based on CRC. The maximum iteration for the turbo decoding may be 8, for example. In case of multiple turbo coded blocks, maximum iterations may be performed on a plurality of coded blocks, except the last one. During the decoding of the last turbo block, the HTDM 324 may use the $1^{st}$ decoded block together with outputs from at least a portion of all previous decoded blocks, may de-scramble the concatenated bitstream, and may checks the CRC of the de-scrambled bits. U.S. application Ser. No. 11/141,478, filed on May 31, 2005, further describes a wireless terminal baseband processor high speed turbo decoding module and is hereby incorporated herein by reference in its entirety.

Figure 4:
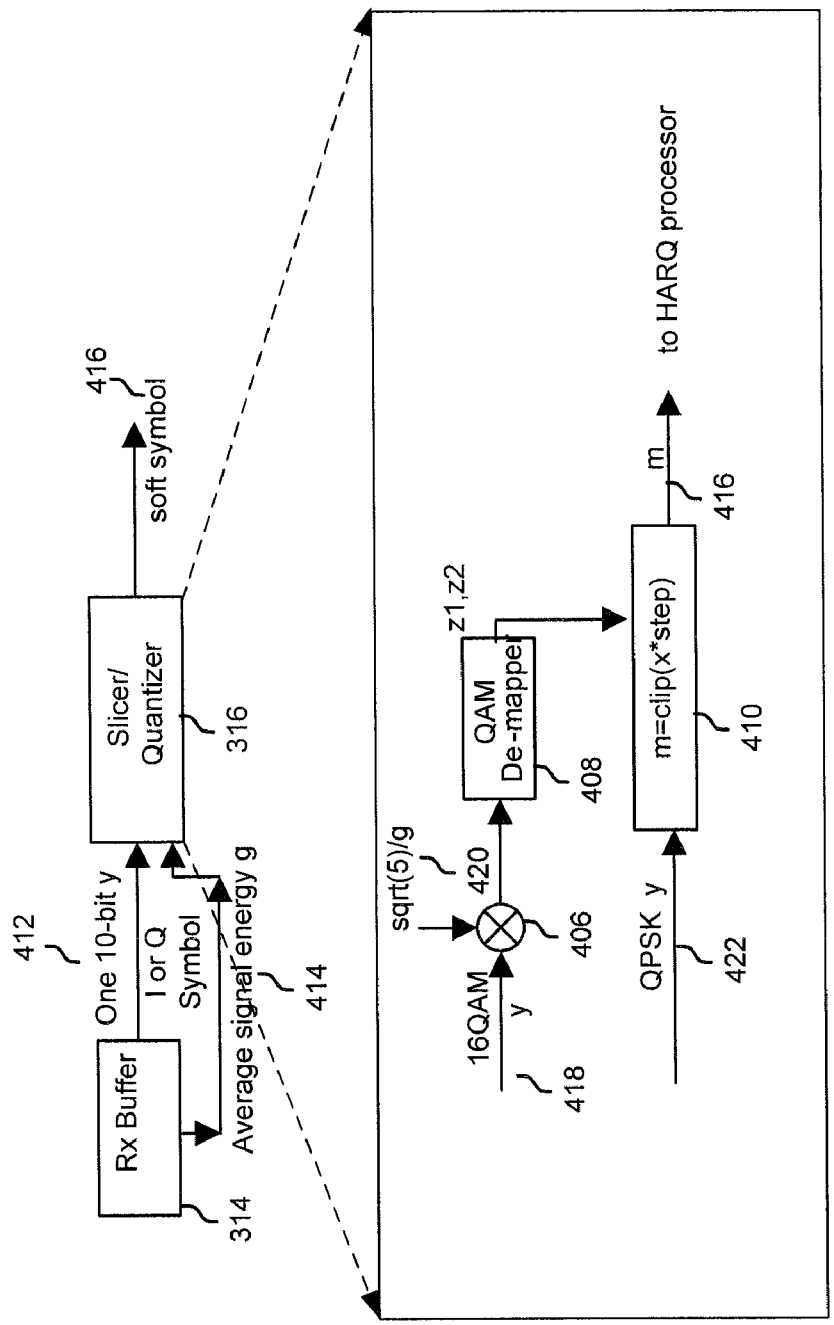
FIG. 4 is a block diagram of an exemplary slicer/quantizer block, in accordance with an embodiment of the invention.

FIG. 4 is a block diagram of an exemplary slicer/quantizer block, in accordance with an embodiment of the invention. Referring to FIG. 4, the slicer/quantizer block 316 may comprise suitable circuitry, logic, and/or code and may enable demodulation function for the 16 QAM signals, and/or quantization of the received signals to 5-bit soft symbols. The output of the slicer/quantizer block 316 may comprise a 5-bit soft symbol 416 and may be communicated to the HARQ processor 320 for further processing. The slicer/quantizer block 316 may comprise a multiplier 406, a QAM de-mapper block 408, and a quantizer 410.

Figure 5:
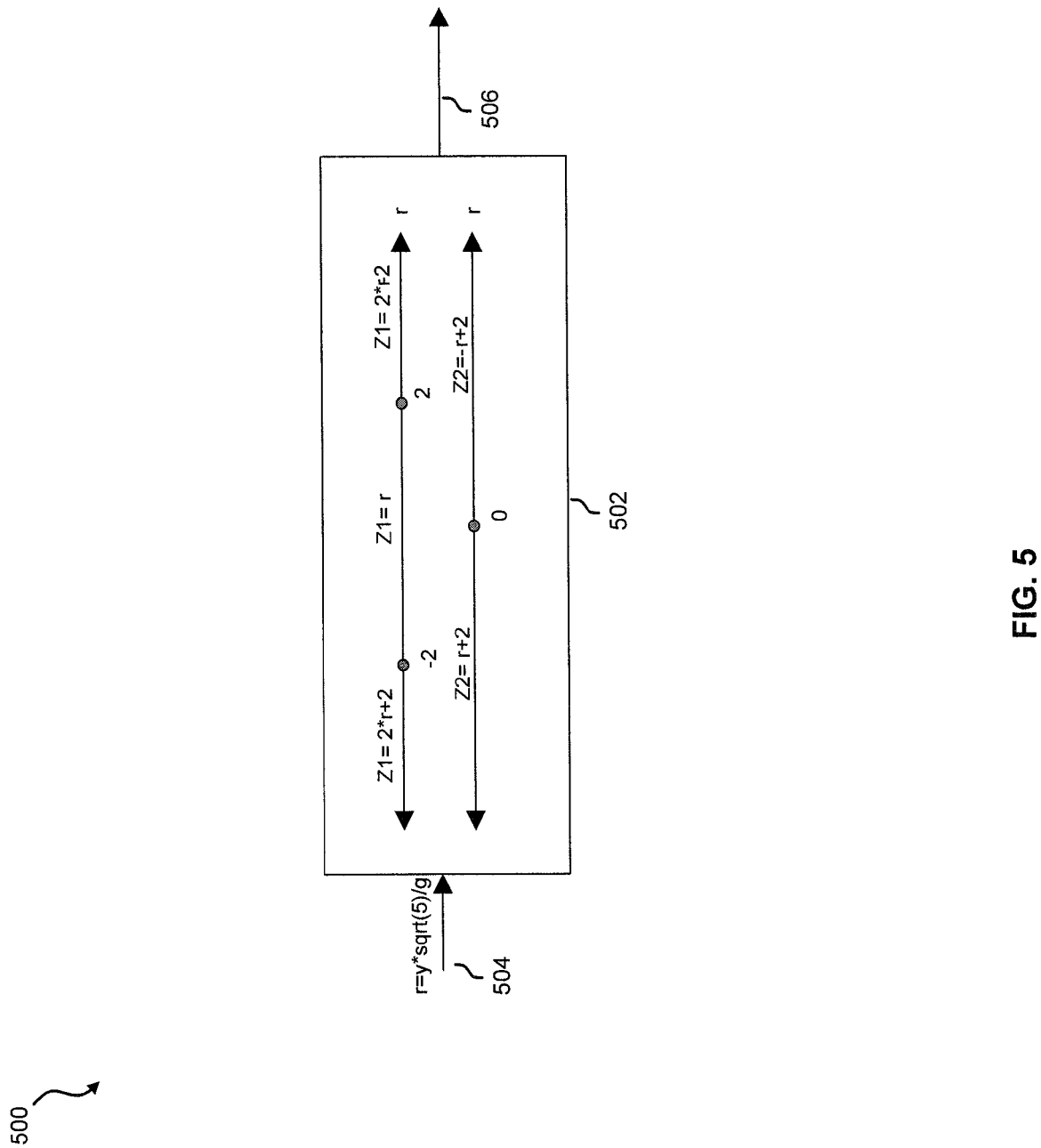
FIG. 5 is a diagram illustrating demodulation decision regions for a 16-quadrature amplitude modulation (QAM) de-mapper block, in accordance with an embodiment of the invention.

The slicer/quantizer block 316 may receive as inputs from the RX buffer 314 modulation type, number of physical channels, 10-bit I, Q symbols 412, and/or average signal energy "g" 414 of the symbols in the RX buffer 314. For 16 QAM signals 418, the 10-bit I or Q symbol from the RX buffer 314 may be scaled by the average signal energy of the N input symbols per TTI period using the multiplier 406 and a normalization factor (sqrt(5)/g) 420 to the 16 QAM constellation with $\{-3,-1,1,3\}$ as reference points. The QAM de-mapping operation, which is illustrated in FIG. 5, may be based on the decision region 502, where two output symbols $I_0$ and $I_1$ for input I or $Q_0$ or $Q_1$ for input Q symbols may be obtained. The output symbols may be forwarded to the quantizer 410, which may enable performing of fixed step quantization and generate the soft bits 416. A value soft_max may represent the maximum value corresponding to the bit-width of the soft symbols 416. For example, for 5-bit soft symbols 416 with one sign bit, soft_max=16. The quantizer 410 may utilize a clipping function, which may be expressed by the following equation:

$$\text{clip}(t)=\max(\min(t,\text{soft\_max}-1),-(\text{soft\_max}-1))$$

For a QPSK signal 422, the QAM-demapper function performed by the QAM de-mapper block 408 may be skipped. The quantization step for the QPSK signal 422 may be based on the average energy "g" of the N received symbols. For each pair of the 16 QAM (I, Q) symbol 418, the output of the slicer/quantizer 316 may be with interleaved I, Q order ($I_0,Q_0, I_1,Q_1$). For 16 QAM signal 418, the optimal quantization step size may be determined by the average energy of the output of the quantizer 410. In accordance with an embodiment of the invention, the quantization step of the quantizer 410 may vary. For example, a fixed quantization step size, such as 5-bit soft symbol 416 for 16 QAM slicer/quantizer 316 may be used. The average signal energy "g" 414 may be used during slicing and quantization.

FIG. 5 is a diagram illustrating demodulation decision regions for a 16-quadrature amplitude modulation (QAM) de-mapper block, in accordance with an embodiment of the invention. Referring to FIGS. 4 and 5, the QAM de-mapping operation performed by the QAM de-mapping block 408 may be based on the decision region 502. The input signal 504 may comprise 10-bit I or Q symbol from the RX buffer 314 that is scaled by the average signal energy of every N input symbols per TTI period. The output signal 506 of the QAM de-mapping block 408 may comprise two output symbols $I_0$ and $I_1$ for an input I or $Q_0$ and $Q_1$ for input Q symbols.

Figure 6A:
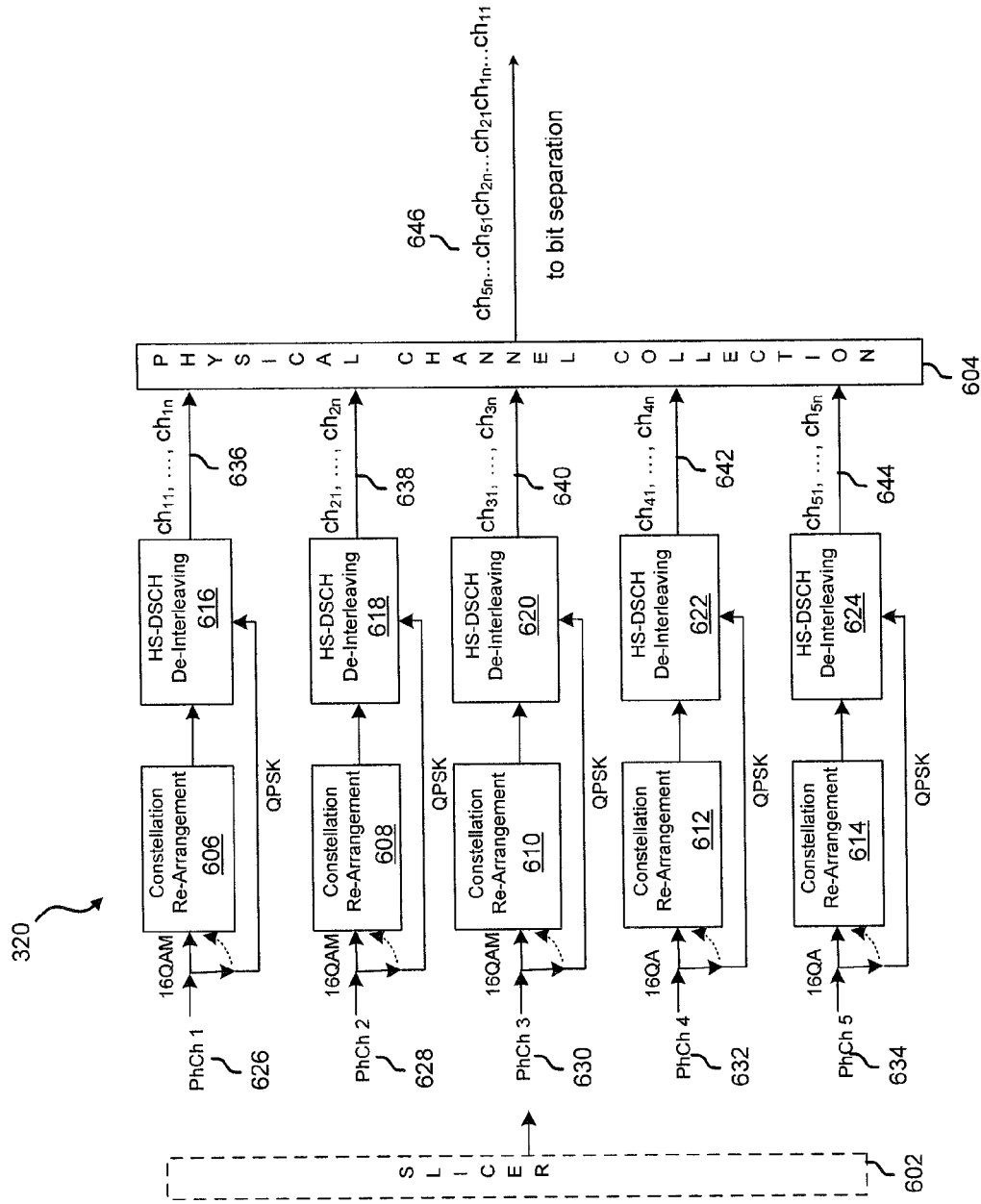
FIG. 6A is a block diagram of an exemplary hybrid automatic request (HARQ) processor, in accordance with an embodiment of the invention.

FIG. 6A is a block diagram of an exemplary hybrid automatic request (HARQ) processor, in accordance with an embodiment of the invention. Referring to FIG. 6A, the HARQ processor 320 may comprise a plurality of constellation re-arrangement blocks (CRB) 606, . . . , 614, a plurality of HS-DSCH de-interleaving blocks (HDB) 616, ..., 624, and a physical channel collection block (PCCB) 604.

The CRB 606, ..., 614 may comprise suitable circuitry, logic, and/or code and may be enabled to perform constellation re-arrangement for the soft bit symbols received from the slicer 602. The soft bit symbols may be communicated from the slicer 602 to the CRB 606, ..., 614 via physical channels 626, ..., 634, respectively. For 16-QAM symbols, the CRB 606, ..., 614 may perform constellation re-arrangement for the output from the slicer/quantizer 602 ($I_0, Q_0, I_1, Q_1$). The constellation re-arrangement may be based on the constellation version parameter "b" derived from redundancy version RV information in the HS-SCCH. Table 2 illustrates the output as function of "b" after the constellation re-arrangement operation on the qua-triple input ($I_0, Q_0, I_1, Q_1$).

TABLE 2

Constellation Re-arrangement for 16-QAM

| constellation version parameter b | Output sequence | Operation |
|---|---|---|
| 0 | $I_0, Q_0, I_1, Q_1$ | None |
| 1 | $I_1, Q_1, I_0, Q_0$ | Swapping MSBs with LSBs |
| 2 | $I_0, Q_0, -I_1, -Q_1$ | Inversion of the logical values of LSBs |
| 3 | $I_1, Q_1, -I_0, -Q_0$ | Swapping MSBs with LSBs and inversion of logical values of LSBs |

Table 3 below illustrates the coding of the RV in turns of the constellation re-arrangement parameter "b", the systematic bit prioritize transmission parameter "s" (s=1, prioritize the systematic bits during $2^{nd}$ stage rate matching), and the parameter "r" that determines the initial error variable $e_{ini}$ of the $2^{nd}$ stage rate matching.

TABLE 3

Redundancy Version Coding for 16-QAM

| RV(value) | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

The HDB 616, ..., 624 may comprise suitable circuitry, logic, and/or code and may enable HS-DSCH de-interleaving of the output received from CRB 606, ..., 614, respectively. The HS-DSCH de-interleaving may be performed for each physical channel 626, ..., 634 separately. The de-interleavers 616, ..., 624 may comprise fixed-size block de-interleavers with 32 rows and 30 columns, for example. The fixed-size block de-interleaver may be the same as the $2^{nd}$ de-interleaver for the normal WCDMA channels. In this regard, the inputs to the HDB 616, ..., 624 may be written to the de-interleavers on a column-by-column basis, and may be followed by an inter-column permutation based on the pattern described in Table 4. The data may then be read out from the permuted matrix on a row-by-row basis.

TABLE 4

Inter-Column Pattern Permutation

| Number of columns C2 | Inter-column permutation pattern <P2(0), P2(1), ..., P2(C2-1)> |
|---|---|
| 30 | <0, 20, 10, 5, 15, 25, 3, 13, 23, 8, 18, 28, 1, 11, 21, 6, 16, 26, 4, 14, 24, 19, 9, 29, 12, 2, 7, 22, 27, 17> |

For a 16-QAM signal, there may be 1920 soft symbols per physical channel. In one embodiment of the invention, two basic de-interleavers may be used for processing a 16-QAM signal. The input soft symbols 318 may be divided two-by-two between the de-interleavers. Assuming for each physical channel 626, ..., 634 that output from the constellation re-arrangement of CRB 606, ..., 614 may be as follows:

$$\hat{I}_0, \hat{Q}_0, \hat{I}_1, \hat{Q}_1, \hat{I}_2, \hat{Q}_2, \hat{I}_3, \hat{Q}_3, \ldots, \hat{I}_{478}, \hat{Q}_{478}, \hat{I}_{479}, \hat{Q}_{479}.$$

In this regard, the symbols $$\hat{I}_0, \hat{Q}_0, \hat{I}_2, \hat{Q}_2, \ldots, \hat{I}_{476}, \hat{Q}_{476}, \hat{I}_{478}, \hat{Q}_{478},$$

may be communicated to the first de-interleaver and the following symbols:

$$\hat{I}_1, \hat{Q}_1, \hat{I}_3, \hat{Q}_3, \ldots, \hat{I}_{477}, \hat{Q}_{477}, \hat{I}_{479}, \hat{Q}_{479},$$

may be communicated to the second interleaver. Symbols may then be re-collected two-by-two from the de-interleavers. Assuming symbols $v_0, v_1, v_2, \ldots v_{959}$ are obtained from the first de-interleaver and $w_0, w_1, w_2, \ldots, w_{959}$ are obtained from the $2^{nd}$ de-interleaver, then the collected-output symbols of the de-interleaver for 16 QAM may be represented as $v_0, v_1, w_0, w_1, v_2, v_3, w_2, w_3, \ldots, v_{958}, v_{959}, w_{958}, w_{959}$. The output symbols 636, ..., 644 from the de-interleaver 616, ..., 624 for each physical channel 626, ..., 634 may be concatenated together by the PCCB 604 to form input symbols 646 to the bit-separation block 652 illustrated in FIG. 6B.

Figure 6B:
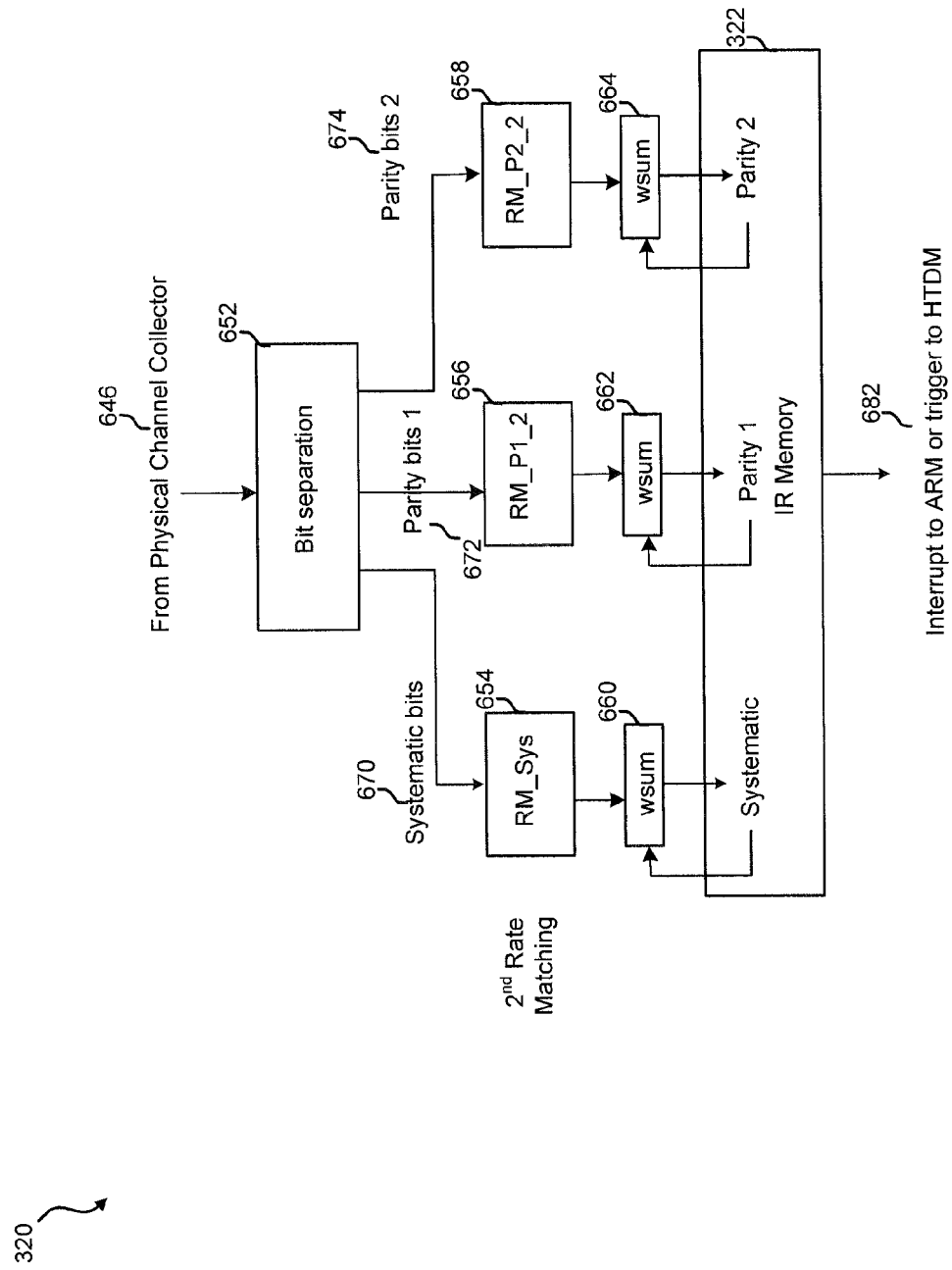
FIG. 6B is a block diagram of an exemplary HARQ processor, in accordance with an embodiment of the invention.

FIG. 6B is a block diagram of an exemplary HARQ processor, in accordance with an embodiment of the invention. Referring to FIG. 6B, the HARQ processor 320 may also comprise a bit separation block 652, $2^{nd}$ rate matching blocks (SRMB) 654, ..., 658, and IR/Chase combining blocks (ICCB) 660, ..., 664.

In accordance with an embodiment of the invention, the following parameters may be configured by a host processor as inputs to the HARQ hardware module 320: modulation type, number of physical channels, constellation re-arrangement parameter "b", intermediate values $N_r$ and $N_c$ related to the systematic bits for the bit separation operation, and/or parameters for $2^{nd}$ rate matching for systematic, parity 1 and parity 2 symbols and the corresponding rate matching modes, such as No RM, repetition, or puncturing. In addition, the HARQ hardware module 320 may receive as inputs individual IR addresses for systematic, parity 1 and parity 2 symbols, the weights for the IR data, and the weight for the current received data. The IR address may indicate to the HARQ processor 320 to fetch the data from a given address, weighted-sum the fetched data and the current received data. The HARQ processor 320 may store an output in the corresponding IR memory address indicated in the input parameters list.

The bit separation block 652 may comprise suitable circuitry, logic, and/or code and may be enabled to perform bit separation on the output signal 646 from the PCCB 604. Bit separation may be achieved using rectangular de-interleaver of size $N_{row} \times N_{col}$, for example. The number of rows and columns may be determined from the following equations:

$N_{row}=4$ for 16QAM and $N_{row}=2$ for QPSK $$N_{col}=N_{data}/N_{row}$$

where $$N_{data} = \begin{cases} 960*N_{phy} & QPSK \\ 1920*N_{phy} & 16-QAM, \end{cases}$$

$N_{phy}$ is the number of physical channels. Accordingly, $N_{col}=480*N_{phy}$. Data may be written into the de-interleaver column-by-column. $N_{t,sys}$ may indicate the number of systematic symbols 670. Intermediate values $N_r$ and $N_c$ may be calculated using the following equation:

$$N_r \left\lfloor \frac{N_{t,sys}}{N_{col}} \right\rfloor$$

and $$N_c = N_{t,sys} - N_r \cdot N_{col}.$$

If Nc=0 and Nr>0, the systematic symbols 670 may be read out from rows 1 ... Nr. Otherwise systematic symbols may be read out from rows 1 ... Nr+1 in the first Nc columns and, if Nr>0, also read out from rows 1 ... Nr in the remaining Ncol-Nc columns. The parity symbols 672 and 674 may be read out from the remaining rows of the respective columns. Parity 1 symbols 672 and parity 2 symbols 674 may be read out in alternating order, starting with parity 2 symbols 674 in the first available column with the lowest index number. In the case of 16 QAM for each column the symbols are read out of the de-interleaver in the order row 1, row 2, row 3, row 4. In the case of QPSK signals, for each column the symbols may be read out of the de-interleaver in the order row 1, row 2.

The SRMB 654, ..., 658 may comprise suitable circuitry, logic, and/or code and may be enabled to perform de-rate-matching on systematic bits 670, parity 1 bits 672, and parity 2 bits 674. The separated systematic symbols 670, parity 1 symbols 672, and parity 2 symbols 674 may be de-rate-matched individually by the SRMB 654, 656, and 658, respectively. The $2^{nd}$ rate matching operation may remove inserted symbols if the total physical channel band-width $N_{data} \geq N_{IR}$, indicating repetition, where $N_{IR}$ may indicate the allocated total IR memory for the given HARQ processor 320. The SRMB 654, ..., 658 may insert erasures "0," if $N_{data} < N_{IR}$, which indicates puncturing. The priority indication bit "s" coded in the redundancy version carried by the HS-SCCH may determine whether the $2^{nd}$ rate matching prioritizes the systematic bits, if s=1, or non-systematic bits, if s=0, when puncturing is needed in the transmission. If the priority is for systematic bits, then the systematic bits may have the least number of punctured bits. The rate matching parameters for $2^{nd}$ rate matching may be pre-calculated using Layer 1 ARM codes, for example, for redundancy versions. The pre-calculation may be performed when the transport block size is known to the host processor, such as an ARM processor, via higher layer signaling.

The ICCB 660, ..., 664 may comprise suitable circuitry, logic, and/or code and may enable combining of the outputs of the SRMB 654, ..., 658 with corresponding systematic or parity symbols stored in the IR memory 322 to form a combined result. Various combining schemes may be utilized and may comprise Chase combining weighted by signal-to-interference ratio (SIR), equal-gain IR combining, weighted IR combining, and/or combining using threshold to replace the existing data in the IR memory, to discard the current received data, or to weighted-combine. The combined result may be clipped to 5-bit soft-symbol, for example, and the clipping result may be stored in the corresponding IR memory location from which the IR data is retrieved. The IR memory 322 may then generate an interrupt/trigger signal 682. An interrupt may be communicated to the host processor, and a trigger signal may be communicated to the HTDM 324.

In one embodiment of the invention, HARQ processing within the BLP 312 may be implemented without the use of a buffer by utilizing pointer calculation, for example, based on a function in the HARQ processor 320. The input to the HARQ processor 320 may be the index of the Rx buffer 314 and the received signal residing in the Rx buffer 314. The output of the HARQ pointer calculation may be the index of the IR memory 322 corresponding to the input index. In this regard, the BLP 312 may utilize the Rx buffer 314 and IR memory 322 for buffering, resulting in reduced memory use by the BLP 312. Furthermore, through several memory address calculations operation between the Rx buffer 314 and IR memory 322, Rx buffer size may be reduced to less than 2 time slots, for example. U.S. application Ser. No. 11/353,818, filed on even date herewith, describes a method and system for bufferless HARQ for supporting HSDPA and is incorporated herein by reference in its entirety.

Figure 7:
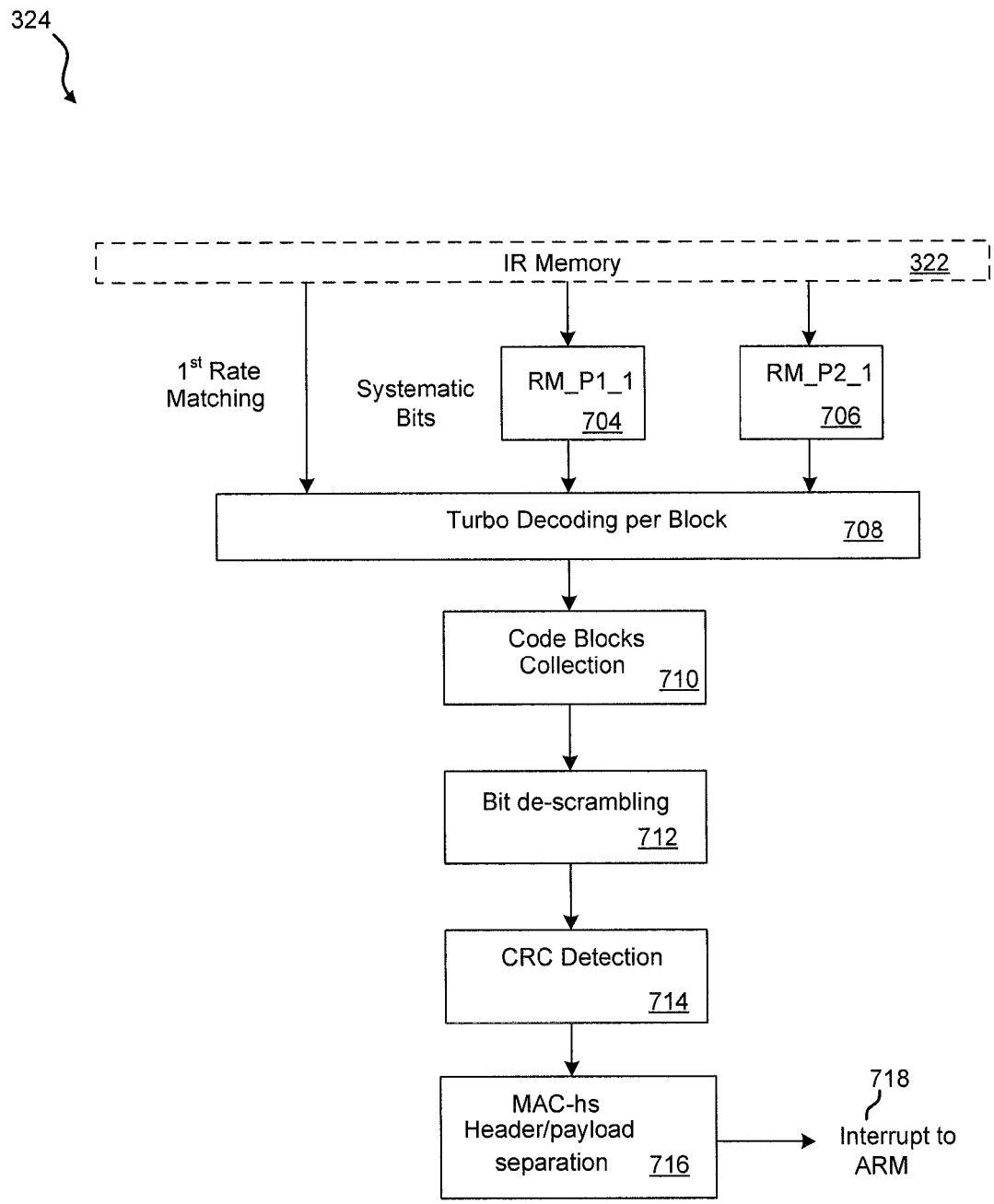
FIG. 7 is a block diagram of an exemplary HSDPA turbo decoding module (HTDM), in accordance with an embodiment of the invention.

FIG. 7 is a block diagram of an exemplary HSDPA turbo decoding module (HTDM), in accordance with an embodiment of the invention. Referring to FIG. 7, the HTDM 324 may comprise first rate matching blocks (FRMB) 704 and 706, a turbo decoding block 708, code blocks collection module (CBCM) 710, a bit de-scrambling block 712, CRC detection block 714, and a header/payload separation block (HPSB) 716.

In one embodiment of the invention, a host processor may configure the following parameters as input to the HTDM 324: turbo decoder related parameters, such as interleaver prime number and/or number of columns; number of coded turbo blocks, the size of the pre-coded block, and number of pre-code fill bits; and parameters for 1st rate matching for parity 1 and parity 2 symbols and the corresponding rate matching modes, such as No RM or puncturing. The host processor may also configure the following parameters as input to the HTDM 324: individual IR addresses for systematic, parity 1 and parity 2 symbols; table for the mapping between SID (size index identifier) for each queue ID (QID) and the MAC-d PDU size; and decoding output mode. The decoding output modes may comprise outputting decoded bits as one whole block and splitting the MAC header and data as two separate blocks aligned in the word boundary. The decoding output modes may also comprise decoding MAC header and output each filed MAC header and each MAC-PDU in separate blocks word-aligned, and decoding MAC header and output each filed MAC header and splits the CTX filed and MAC-PDU in separate word boundary.

The FRMB 704 and 706 may comprise suitable circuitry, logic, and/or code and may enable first rate matching on parity 1 and parity 2 bits, respectively, received from the IR memory 322. The $1^{st}$ rate matching operation may be the same as the rate matching operation for the normal WCDMA data block, except that only puncturing may be performed. In this regard, if the number of coded data bits is smaller than the allocated IR memory 322, then no operation may be performed on the block.

The turbo decoding block 708 may comprise suitable circuitry, logic, and/or code and may be enabled to perform ⅓ rate turbo decoding with iterations. Furthermore, to reduce decoding complexity, early termination based on CRC may be used. After iterative decoding of the first decoder, decoded systematic bits, parity 1 and parity 2 bits may be combined by the code block collection module 710. The bits may then be de-scrambled by the bit de-scrambling block 712.

The CRC detection block 714 may perform CRC checking on the de-scrambled decoded bits received from the bit de-scrambling block 712. The bit scramble function may use the turbo decoded bits and scramble it with the bit sequence defined by the HSDPA specification.

If the CRC passes, then the decoding may be terminated. Otherwise, the HTDM 324 may continue with the next round of the decoding until it reaches the maximum iteration. For multiple turbo coded blocks, early termination may be performed on the last of the coded blocks. For example, a maximum of 3 turbo coded blocks may be possible for Category 7 or 8. During decoding, the first two coded blocks may go through 8 iterative decoding. The decoded bits may be stored in the internal memory of the HTDM 324. During the decoding of the last coded block, at the end of every decoding from the $1^{st}$ decoder, the decoded bits together with the decoded bits from the previous two blocks may be concatenated, de-scrambled and CRC checked. If CRC passes, then the decoding may be terminated. After CRC checking passes, the decoded bitstream may be communicated to the HPSB 716. The HPSB 716 may decode the header of the MAC-hs PDU and, based on the header information, the HPSB 716 may format the output into a corresponding format. The HTDM 324 may output data in four different formats configured by the ARM. Three of the formats may split the MAC header from the payload of the decoded bits to save processor instruction cycles, utilizing the HPSB 716. The split payload and header of the decoded bits may then be transferred to external memory.

Figure 8:
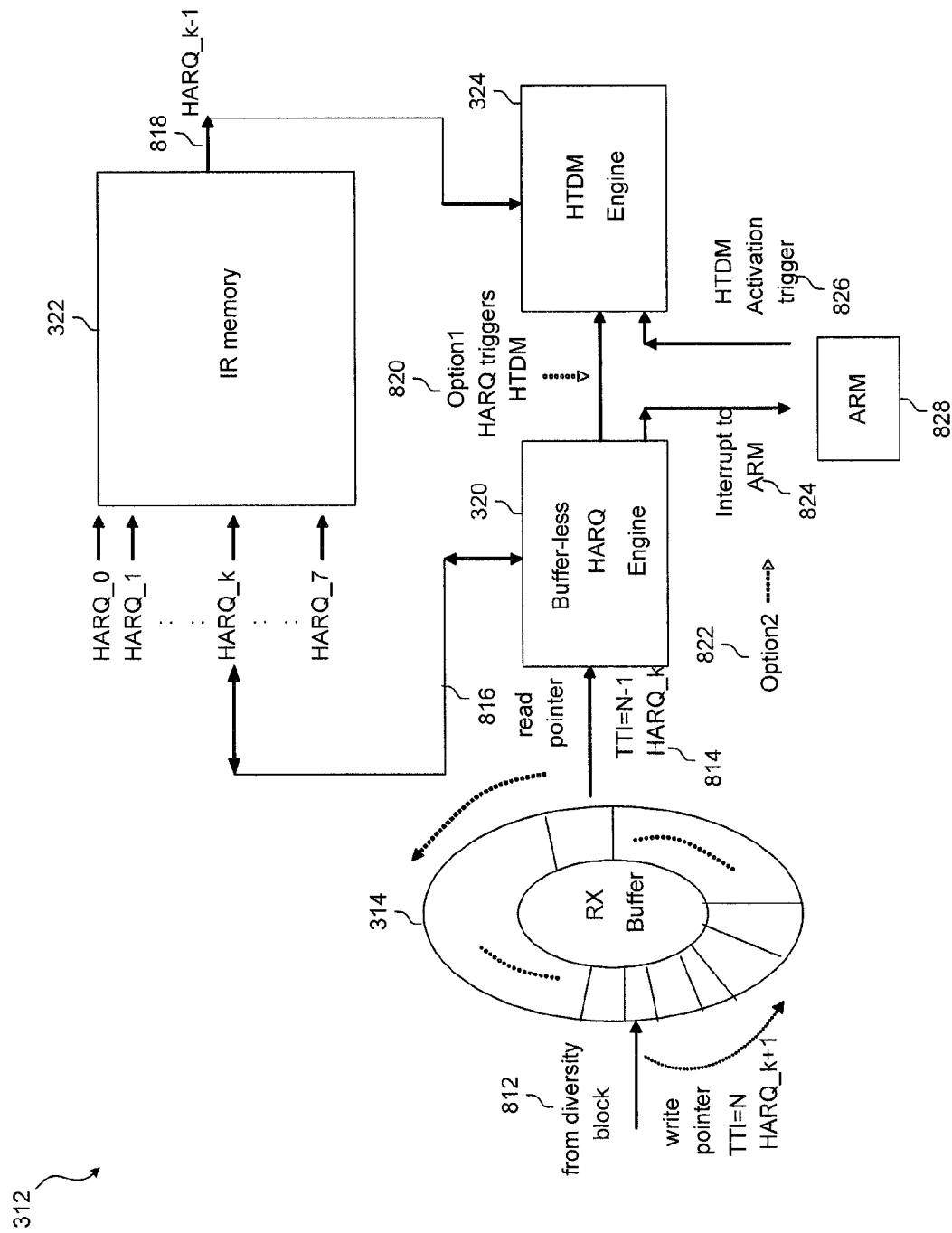
FIG. 8 is a block diagram of a bit level processor (BLP) architecture, in accordance with an embodiment of the invention.

FIG. 8 is a block diagram of bit level processor (BLP) architecture, in accordance with an embodiment of the invention. Referring to FIG. 8, the BLP 312 may comprise an RX buffer 314, an IR memory 322, a HARQ processor 320, an HTDM engine 324, and a host processor, such as an ARM processor 828. The functionalities of RX buffer 314, the IR memory 322, the HARQ processor 320, and the HTDM engine 324 are explained herein with respect to FIG. 3 above.

In accordance with an embodiment of the invention, the BLP 312 may be configured to operate in a pipeline fashion to achieve higher throughput. For example, while the RX buffer 314 is moving the received soft symbols from the diversity block for the current TTI block 812, the HARQ processor 320 may be operating on the previous TTI block 814, and the HTDM 324 may be processing (current-2) block 818. In this regard, one engine does not have to wait for the completion of other processors. Therefore, minimum packet decoding delay and higher data throughput may be achieved. In addition, flexible interface control may be provided between the HARQ processor 320 and the HTDM 324. The two engines may be configured and operated separately via their corresponding set of interface control registers.

Operation of the HTDM 324 may be triggered via two options—option 1 820 and option 2 822. Under option 1 820, upon completing processing of a block, the HARQ engine 320 may communicate a signal directly to the HTDM 324. When option 1 820 is used, the two sets of the control interface registers may be configured by firmware prior the initiation of the HARQ engine 320. Under option 2 822, when HARQ 320 completes processing of a block, it may communicate an interrupt 824 to the ARM 828. When the ARM 828 receives the interrupt 824, the ARM 828 may communicate an HTDM activation trigger signal 826, which may configure the HDTM control interface registers and may actives the HDTM 324.

Figure 9:
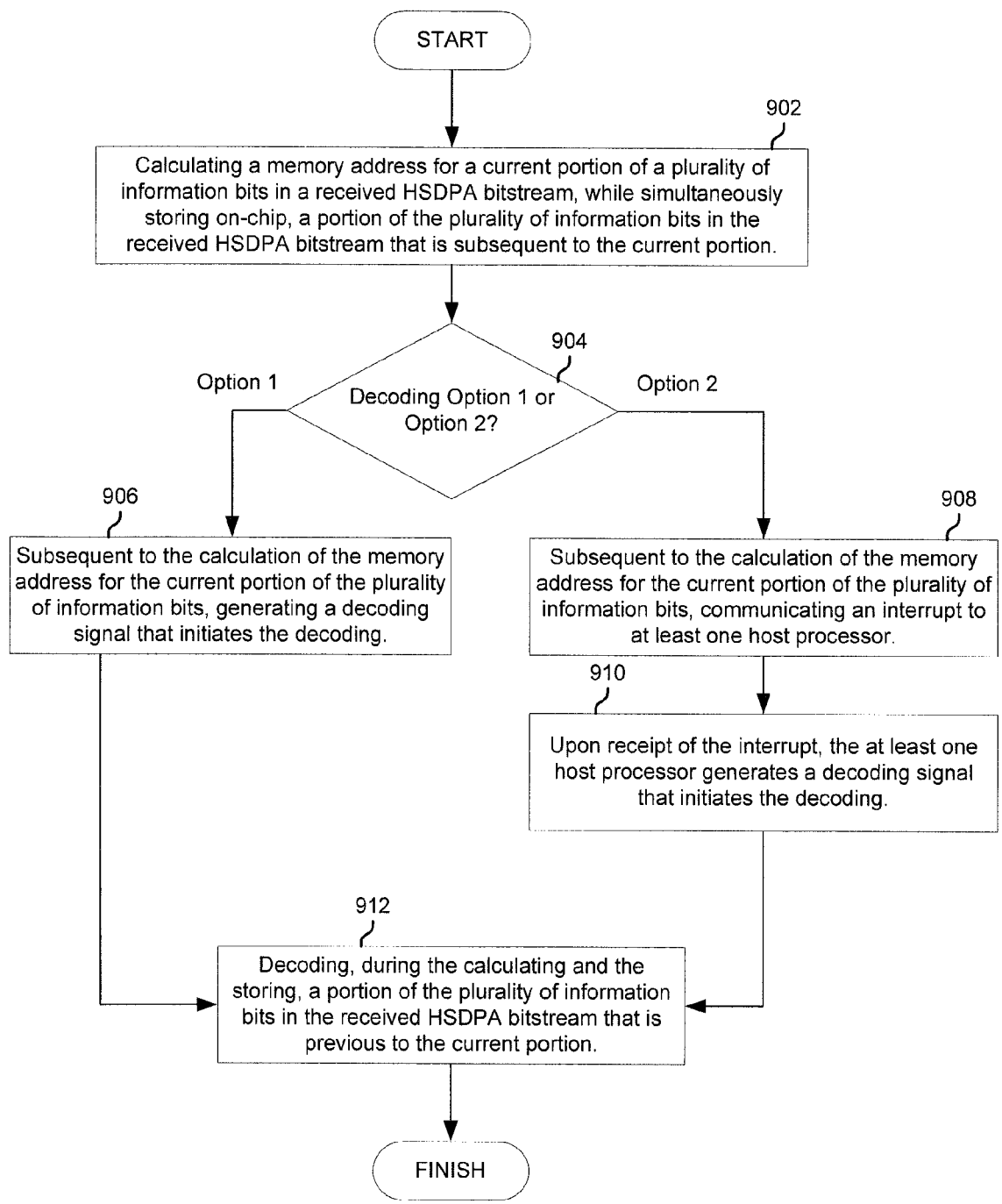
FIG. 9 is a flow diagram of exemplary steps for processing signals in a communication system, in accordance with an embodiment of the invention.

FIG. 9 is a flow diagram of exemplary steps for processing signals in a communication system, in accordance with an embodiment of the invention. Referring to FIGS. 8 and 9, at 902, a memory address 816 may be calculated for a current portion 814 of a plurality of information bits in a received HSDPA bitstream, while simultaneously storing on-chip, a portion 812 of the plurality of information bits in the received HSDPA bitstream that is subsequent to the current portion. At least a portion of the plurality of information bits in the received HSDPA bitstream may be sliced to calculate the memory address 816. At least a portion of the plurality of information bits in the received HSDPA bitstream may be quantized to calculate the memory address 816s. The calculation of the memory address 816 for the current portion 814 of the plurality of information bits may comprise constellation re-arrangement, second level de-interleaving, symbol sequence concatenation, symbol sequence splitting, and/or de-rate-matching.

At 904, it may be determined whether decoding option 1 820 or decoding option 2 822 may be selected. If decoding option 1 820 is selected, at 906, a decoding signal that initiates the decoding may be generated subsequent to the calculation of the memory address 816 for the current portion of the plurality of information bits. If decoding option 2 is selected, at 908, an interrupt 824 may be communicated to at least one host processor, such as the ARM 828, subsequent to the calculation of the memory address 816 for the current portion 814 of the plurality of information bits. At 910, upon receipt of the interrupt 824, the ARM 828 may generate a decoding signal 826 that initiates the decoding by the HTDM 324. At 912, during the calculating and the storing, a portion 818 of the plurality of information bits in the received HSDPA bitstream that is previous to the current portion may be decoded by the HTDM 324. The decoding may comprise first rate de-matching, turbo decoding, de-scrambling, and/or cyclic redundancy check (CRC) checking.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals in a communication system, the method comprising:
   pipelining processing of a received HSDPA bitstream within a single chip, wherein said pipelining comprises:
      calculating a memory address for a current portion of a plurality of information bits in said received HSDPA bitstream, while storing on-chip, a portion of said plurality of information bits in said received HSDPA bitstream that is subsequent to said current portion; and
      decoding during said calculating and storing, a portion of said plurality of information bits in said received HSDPA bitstream that is previous to said current portion.

2. The method according to claim 1, wherein said calculation of said memory address for said current portion of said plurality of information bits is achieved without the use of a buffer.

3. The method according to claim 1, comprising partitioning processing of said plurality of information bits in said received HSDPA bitstream into a functional data processing path and a functional address processing path.

4. The method according to claim 1, comprising, subsequent to said calculation of said memory address for said current portion of said plurality of information bits, generating a decoding signal that initiates said decoding.

5. The method according to claim 1, comprising, subsequent to said calculation of said memory address for said current portion of said plurality of information bits, communicating an interrupt to at least one host processor.

6. The method according to claim 5, comprising, upon receipt of said interrupt by said at least one host processor, generating by said at least one host processor a decoding signal that initiates said decoding.

7. The method according to claim 1, comprising, initiating said decoding subsequent to said calculation of said memory address for said current portion of said plurality of information bits, and without the use of an interrupt.

8. The method according to claim 1, comprising slicing at least a portion of said plurality of information bits in said received HSDPA bitstream to calculate said memory address.

9. The method according to claim 1, comprising quantizing at least a portion of said plurality of information bits in said received HSDPA bitstream to calculate said memory address.

10. The method according to claim 9, wherein said quantizing is based on signal quality of said received HSDPA bitstream.

11. The method according to claim 9, comprising normalizing said at least said portion of said plurality of information bits in said received HSDPA bitstream to calculate said memory address.

12. The method according to claim 11, wherein said normalizing and said quantizing are based on signal quality of said received HSDPA bitstream.

13. The method according to claim 11, comprising normalizing at least a portion of said plurality of information bits in said received HSDPA bitstream to calculate said memory address.

14. The method according to claim 13, wherein said normalizing is based on signal quality of said received HSDPA bitstream.

15. The method according to claim 1, wherein said calculation of said memory address for said current portion of said plurality of information bits comprises one or more of constellation re-arrangement, second level de-interleaving, symbol sequence concatenation, symbol sequence splitting, and/or de-rate-matching.

16. The method according to claim 1, wherein said decoding comprises one or more of first rate de-matching, turbo decoding, de-scrambling, and/or cyclic redundancy check (CRC) checking.

17. A non-transitory computer-readable medium having stored thereon, a computer program having at least one code section for processing signals in a communication system, the at least one code section being executable by a computer for causing the computer to perform steps comprising:
   pipelining processing of a received HSDPA bitstream within a single chip, wherein said pipelining comprises:
      calculating a memory address for a current portion of a plurality of information bits in said received HSDPA bitstream, while storing on-chip, a portion of said plurality of information bits in said received HSDPA bitstream that is subsequent to said current portion; and
      decoding during said calculating and storing, a portion of said plurality of information bits in said received HSDPA bitstream that is previous to said current portion.

18. The non-transitory computer-readable medium according to claim 17, wherein said calculation of said memory address for said current portion of said plurality of information bits is achieved without the use of a buffer.

19. The non-transitory computer-readable medium according to claim 17, comprising code for partitioning processing of said plurality of information bits in said received HSDPA bitstream into a functional data processing path and a functional address processing path.

20. The non-transitory computer-readable medium according to claim 17, comprising code for generating a decoding signal that initiates said decoding, subsequent to said calculation of said memory address for said current portion of said plurality of information bits.

21. The non-transitory computer-readable medium according to claim 17, comprising code for communicating an interrupt to at least one host processor, subsequent to said calculation of said memory address for said current portion of said plurality of information bits.

22. The non-transitory computer-readable medium according to claim 21, comprising code for generating by said at least one host processor a decoding signal that initiates said decoding, upon receipt of said interrupt by said at least one host processor.

23. The non-transitory computer-readable medium according to claim 17, comprising code for initiating said decoding subsequent to said calculation of said memory address for said current portion of said plurality of information bits, and without the use of an interrupt.

24. The non-transitory computer-readable medium according to claim 17, comprising code for slicing at least a portion of said plurality of information bits in said received HSDPA bitstream to calculate said memory address.

25. The non-transitory computer-readable medium according to claim 17, comprising code for quantizing at least a portion of said plurality of information bits in said received HSDPA bitstream to calculate said memory address.

26. The non-transitory computer-readable medium according to claim 25, wherein said quantizing is based on signal quality of said received HSDPA bitstream.

27. The non-transitory computer-readable medium according to claim 25, comprising code for normalizing said at least said portion of said plurality of information bits in said received HSDPA bitstream to calculate said memory address.

28. The non-transitory computer-readable medium according to claim 17, wherein said normalizing and said quantizing are based on signal quality of said received HSDPA bitstream.

29. The non-transitory computer-readable medium according to claim 17, comprising code for normalizing at least a portion of said plurality of information bits in said received HSDPA bitstream to calculate said memory address.

30. The non-transitory computer-readable medium according to claim 29, wherein said normalizing is based on signal quality of said received HSDPA bitstream.

31. The non-transitory computer-readable medium according to claim 17, comprising code for quantizing at least a portion of said plurality of information bits in said received HSDPA bitstream to calculate said memory address.

32. The non-transitory computer-readable medium according to claim 17, wherein said calculation of said memory address for said current portion of said plurality of information bits comprises one or more of constellation re-arrangement, second level de-interleaving, symbol sequence concatenation, symbol sequence splitting, and/or de-rate-matching.

33. The non-transitory computer-readable medium according to claim 17, wherein said decoding comprises one or more of first rate de-matching, turbo decoding, de-scrambling, and/or cyclic redundancy check (CRC) checking.

34. A system for processing signals in a communication system, the system comprising:
    circuitry that enables pipelining processing of a received HSDPA bitstream within a single chip, wherein said circuitry that enables said pipelining comprises:
        one or more circuits that enables calculation of a memory address for a current portion of a plurality of information bits in said received HSDPA bitstream;
        said one or more circuits enables storing on-chip of a portion of said plurality of information bits in said received HSDPA bitstream that is subsequent to said current portion; and
        said one or more circuits enables decoding during said calculating and said storing of a portion of said plurality of information bits in said received HSDPA bitstream that is previous to said current portion.

35. The system according to claim 34, wherein said calculation of said memory address for said current portion of said plurality of information bits is achieved without the use of a buffer.

36. The system according to claim 34, wherein said one or more circuits enables partitioning of processing of said plurality of information bits in said received HSDPA bitstream into a functional data processing path and a functional address processing path.

37. The system according to claim 34, wherein said one or more circuits enables generation of a decoding signal that initiates said decoding, subsequent to said calculation of said memory address for said current portion of said plurality of information bits.

38. The system according to claim 34, wherein said one or more circuits enables communication of an interrupt to at least one host processor, subsequent to said calculation of said memory address for said current portion of said plurality of information bits.

39. The system according to claim 38, wherein said at least one host processor enables generation of a decoding signal that initiates said decoding, upon receipt of said interrupt by said at least one host processor.

40. The system according to claim 34, wherein said one or more circuits enables initiating said decoding subsequent to said calculation of said memory address for said current portion of said plurality of information bits, and without the use of an interrupt.

41. The system according to claim 34, wherein said one or more circuits enables slicing of at least a portion of said plurality of information bits in said received HSDPA bitstream to calculate said memory address.

42. The system according to claim 34, wherein said one or more circuits enables quantizing at least a portion of said plurality of information bits in said received HSDPA bitstream to calculate said memory address.

43. The system according to claim 42, wherein said quantizing is based on signal quality of said received HSDPA bitstream.

44. The system according to claim 42, wherein said one or more circuits enables normalizing said at least said portion of said plurality of information bits in said received HSDPA bitstream to calculate said memory address.

45. The system according to claim 44, wherein said normalizing and said quantizing are based on signal quality of said received HSDPA bitstream.

46. The system according to claim 34, wherein said one or more circuits enables normalizing at least a portion of said plurality of information bits in said received HSDPA bitstream to calculate said memory address.

47. The system according to claim 46, wherein said normalizing is based on signal quality of said received HSDPA bitstream.

48. The system according to claim 34, wherein said one or more circuits enables quantizing of at least a portion of said plurality of information bits in said received HSDPA bitstream to calculate said memory address.

49. The system according to claim 34, wherein said calculation of said memory address for said current portion of said plurality of information bits comprises one or more of constellation re-arrangement, second level de-interleaving, symbol sequence concatenation, symbol sequence splitting, and/or de-rate-matching.

50. The system according to claim 34, wherein said decoding comprises one or more of first rate de-matching, turbo decoding, de-scrambling, and/or cyclic redundancy check (CRC) checking.

* * * * *